Patented Aug. 21, 1928.

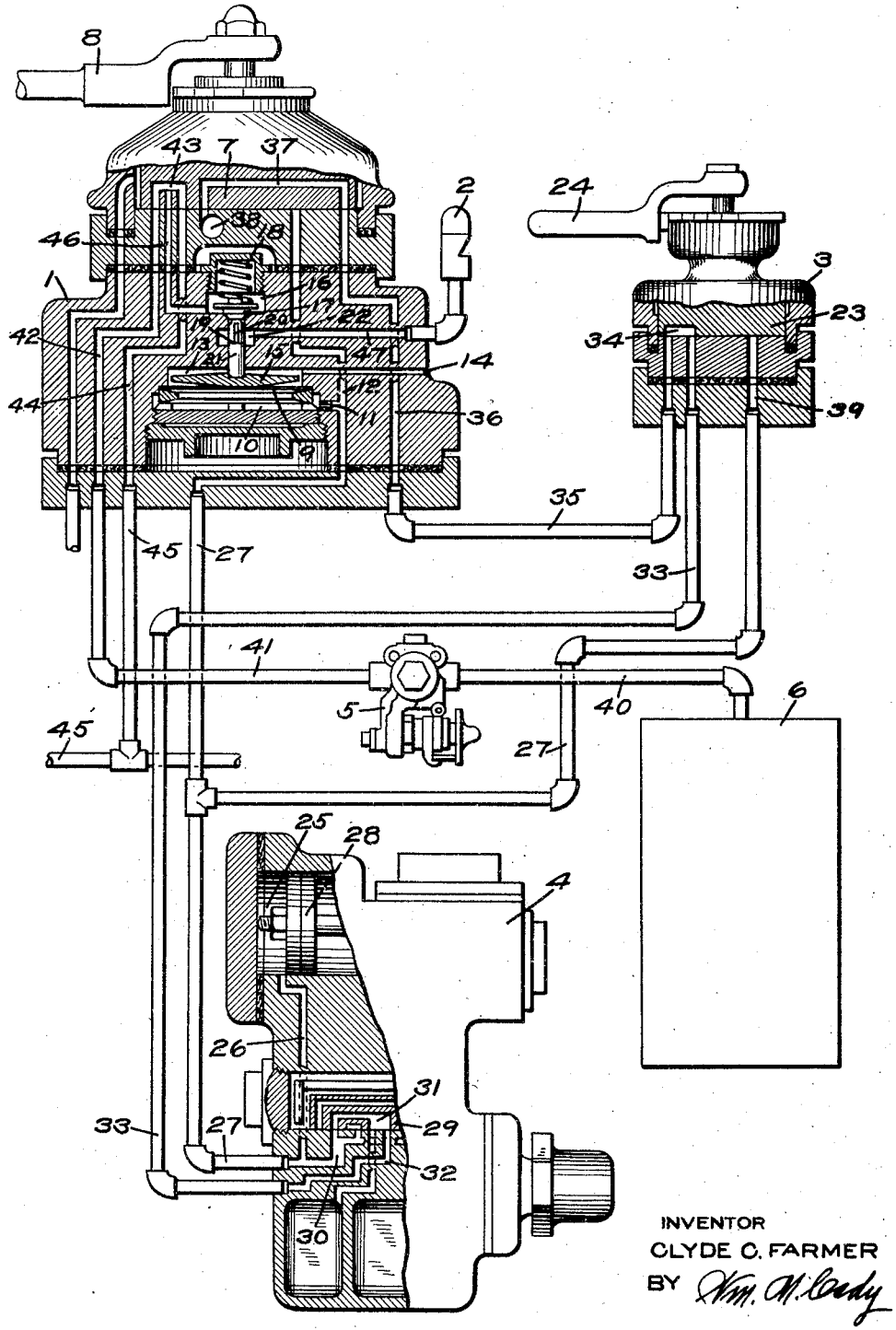

1,681,578

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed January 27, 1927. Serial No. 163,944.

This invention relates to fluid pressure brakes and more particularly to a locomotive brake equipment.

The usual standard locomotive brake equipment includes a distributing valve device, an automatic brake valve device, and an indpendent brake valve device, and the locomotive brakes are controlled by the operation of said brake valve devices through a distributing valve release pipe and an application cylinder pipe, which connects the brake valve devices to the distributing valve device.

With both of the brake valve devices in running position, the application cylinder of the distributing valve device is connected to the atmosphere through the distributing valve release pipe, while the application cylinder pipe connection is lapped at each brake valve device.

Since communication from the application cylinder to the release pipe is controlled by the slide valve of the equalizing portion of the distributing valve device, the locomotive brakes are released through the distributing valve release pipe only, when the equalizing piston and slide valve of the distributing valve device are in release position.

If the equalizing piston and slide valve should creep or shift from the release position toward the service position, due to a decrease in brake pipe pressure, such as might be caused by a feed valve device working on a greater than usual range, the connection from the application cylinder of the distributing valve device to the distributing valve release pipe may be closed, so that if fluid under pressure should leak into said application cylinder, there will be a tendency for the fluid pressure to build up therein and thus cause an application of the brakes when not intended.

The principal object of my invention is to provide means adapted to warn the operator when the locomotive brakes are beginning to apply, under circumstances such as above described.

In the accompanying drawing, the single figure is a diagrammatic view, partly in section, of a locomotive fluid pressure brake equipment, with my invention embodied therein.

As shown in the drawing, the brake equipment may comprise an automatic brake valve device 1, having associated therewith a whistle device 2, an independent brake valve device 3, a distributing valve device 4, a feed valve device 5 and a main reservoir 6.

The automatic brake valve device 1 may comprise a casing having a chamber containing the usual rotary valve 7, adapted to be operated by a handle 8.

According to my invention, the brake valve casing also contains a flexible diaphragm 9, forming a chamber 10, at one side, connected through a choke plug 11 with passage 12, and a chamber 13 at the opposite side connected by passage 14 to the atmosphere and containing a convex plate 15 engaging said diaphragm. Said casing also has a chamber 16 containing a valve 17, subject on one side to the pressure of a spring 18 and having a stem 19 adapted to extend through a chamber 22 and a bore in the partition wall separating the chamber 22 from chamber 13. The stem 19 is adapted to engage the upper face of the convex plate 15. The upper portion 20 of the valve stem 19 is fluted, while the lower portion 21 has a neat sliding fit in said bore.

The independent brake valve device 3 comprises a casing having a chamber containing the usual rotary valve 23 adapted to be operated by a handle 24.

The distributing valve device 4 comprises a casing having an application cylinder 25 in constant communication through passage 26 with the application cylinder pipe 27, and containing an application piston 28, adapted to operate valves (not shown) for controlling the application and release of the locomotive brakes.

Also contained in the casing of the distributing valve device 4 is the usual equalizing slide valve 29 adapted to be operated by an equalizing piston (not shown).

In operation, with the brake valve handles 8 and 24 in running position and with the equalizing slide valve 29 of the distributing valve device 4 in release position, the application cylinder 25 of said device is connected with the atmosphere by way of passages 26 and 30, cavity 31 in the equalizing slide valve 29, passage 32, the distributing valve release pipe 33, cavity 34 in the rotary valve 23 of the independent brake valve device 3, pipe 35, passage 36 in the automatic brake valve device 1, cavity 37 in the rotary valve 7 and atmospheric exhaust port 38. The application cylinder pipe 27, in constant communication with the application cylinder 25 through passage 26, is connected to passages 12 and 39 of the automatic and independent brake valve devices, respectively, said passages being lapped by the rotary valve in each brake valve device when the handles of said devices are in running position.

Fluid under pressure from the main reservoir 6 flows through pipe 40 to the feed valve device 5, which operates in the usual manner to supply fluid at the reduced pressure carried in the brake pipe. Fluid at the reduced pressure then flows through pipe 41, passage 42 in the automatic brake valve device 1, cavity 43 in the rotary valve 7 and passage 44 to the brake pipe 45, charging said brake pipe.

Fluid at the reduced pressure also flows through cavity 43 in the rotary valve 7 to passage 46 and into valve chamber 16.

If for any reason, the equalizing slide valve 29 of the distributing valve device 4 should creep toward service position while the brake valve devices are in running position, communication between passage 30 and passage 32 will be cut off, so that any leakage of fluid under pressure into the application cylinder 25 tends to build up a pressure in the face of the application piston 28 and thus cause movement of said piston so as to cause an application of the brakes.

Upon an increase in pressure in the application cylinder 25, however, as above described, said cylinder being connected through the application pipe 27, passage 12, and choke plug 11, to chamber 10 at one side of the diaphragm 9 in the automatic brake valve device, a corresponding pressure builds up in diaphragm chamber 10, and since the diaphragm chamber 13 is connected to the atmosphere through passage 14, the diaphragm is operated to open the valve 17. Said valve being opened, fluid under pressure is supplied from chamber 16 to chamber 22 and thence through passage 47 to the whistle device 2, which produces a sound by the flow of fluid under pressure through it to the atmosphere, in the well known manner.

Chamber 13 is connected to the atmosphere through passage 14, so that in case fluid under pressure leaks from chamber 22 past the sliding fit of the lower portion 21 of the valve stem 19 and into chamber 13, said leakage cannot build up a pressure therein to act upon the diaphragm 9.

The diaphragm 9 will operate to open the valve 17 at a pressure of fluid in chamber 10 less than that required to operate the application piston 28 of the distributing valve device 4. Thus the whistle 28 will blow before the locomotive brakes start to apply.

When the operator is thus warned of an undesired pressure build-up in the application cylinder of the distributing valve device, he can move the independent brake valve handle 24 so as to connect the application cylinder 25 through the application cylinder pipe 27 directly to the atmosphere and thus he is enabled to prevent the locomotive brakes from being applied.

When an application of locomotive and train brakes is made by operation of the automatic brake valve device in the usual manner, communication from cavity 43 of the rotary valve 7 to passage 46 is cut off, so that even though the diaphragm 9 is operated to open the valve 17, there being no supply of fluid under pressure to the valve chamber 16, no fluid can be supplied to the whistle 2 to operate same.

If the diaphragm 9 should become ruptured, then when an application of the brakes is made, leakage from the application cylinder of the distributing valve device to chamber 13 and thence to atmosphere through passage 14 can take place, which will tend to release the locomotive brakes. The choke plug 11 interposed between the application cylinder pipe and diaphragm chamber 10 reduces the rate of said leakage to a low degree, so as to prevent an immediate release of the locomotive brakes, when the independent brake valve handle 24 is in running position. Furthermore, said choke permits an operator to maintain the brake cylinder pressure against the leakage through said choke, by the movement of the independent brake valve device to application position.

Having now described my invention, what I claim as new and desire to secure by Letters Patent, is:—

1. In a fluid pressure brake, the combination with a locomotive brake equipment including a distributing valve device having an application cylinder and a brake valve device, of means incorporated in said brake valve device for warning the engineer when the pressure in said cylinder is unintentionally built up.

2. In a fluid pressure brake, the combination with a locomotive brake equipment including a distributing valve device having an application cylinder and a brake valve device, of means connected directly to said cylinder and operated by an increase in pressure in said cylinder for warning the engineer.

3. In a fluid pressure brake, the combination with a locomotive brake equipment including a distributing valve device having an application cylinder and a brake valve device, of means connected to said cylinder independently of the position of said brake valve device and operated by an increase in pressure in said cylinder for warning the engineer of such increase.

4. In a fluid pressure brake, the combination with a locomotive brake equipment including a distributing valve device having an application cylinder and a brake valve device, of a flexible diaphragm incorporated in said brake valve device and subject to the pressure of fluid in said cylinder, and a valve operated by said diaphragm upon an increase in pressure in said cylinder for warning the engineer of such increase in pressure.

5. In a fluid pressure brake, the combination with a locomotive brake equipment including a distributing valve device having an application cylinder and a brake valve device, of a flexible diaphragm incorporated in said brake valve device and subject to the pressure of fluid in said cylinder and on the opposite side to atmospheric pressure, a warning device, and a valve operated by said diaphragm upon an increase in pressure in said cylinder for effecting the operation of said warning device.

In testimony whereof I have hereunto set my hand.

CLYDE C. FARMER.